Figure 6:
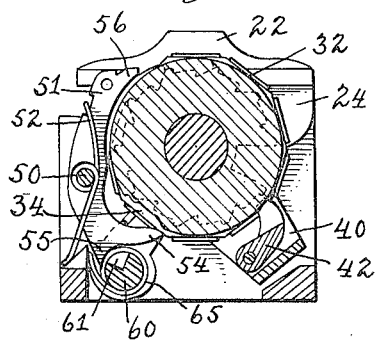

M. H. KERN.
NUMBERING MACHINE.
APPLICATION FILED MAR. 13, 1915.
1,157,699. Patented Oct. 26, 1915.
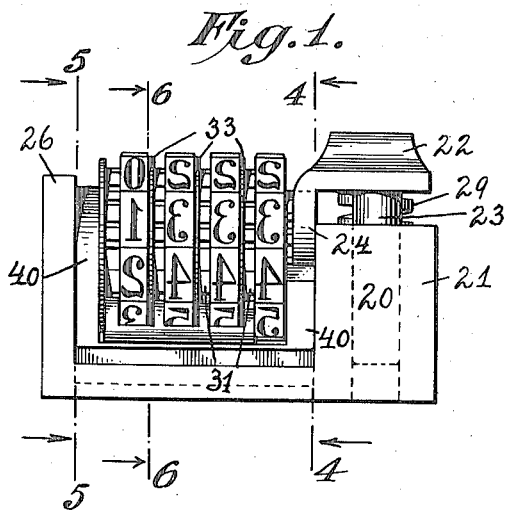
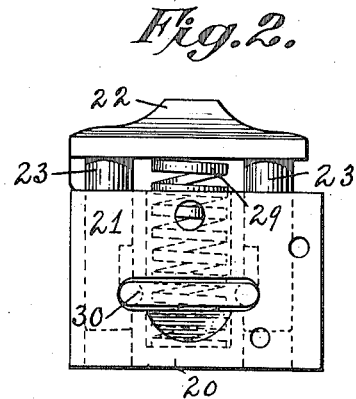
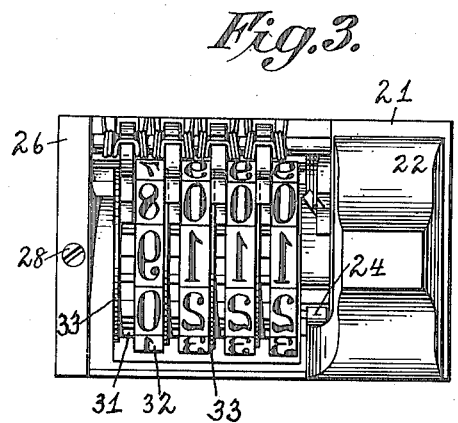
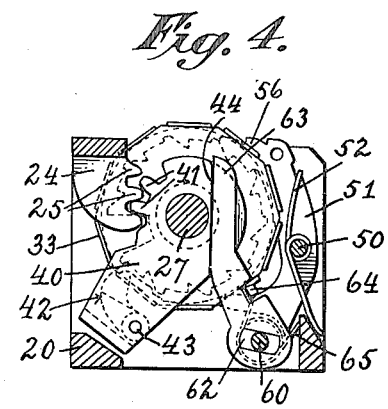
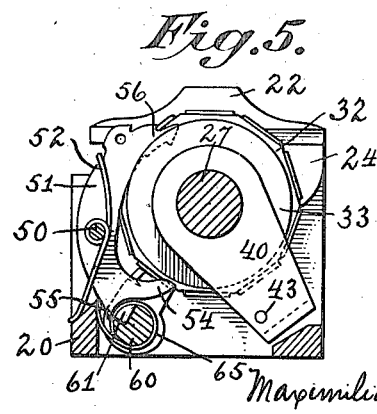
Maximilian H. Kern, Inventor:
by William R. Baird
his Atty

M. H. KERN.
NUMBERING MACHINE.
APPLICATION FILED MAR. 13, 1915.

1,157,699.

Patented Oct. 26, 1915.
3 SHEETS—SHEET 2.

Attest:
Alsa L. Miller
Mary H. Lewis

Maximilian H. Kern, Inventor:
by William R. Baird
his Atty

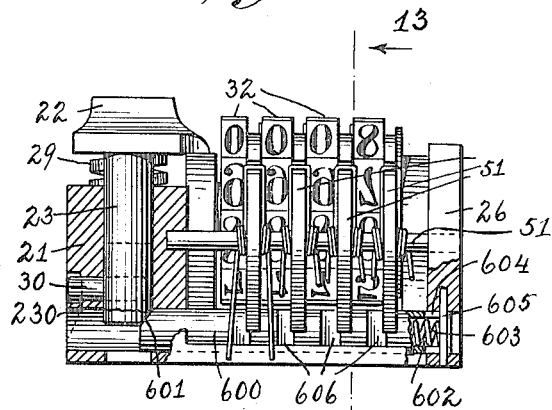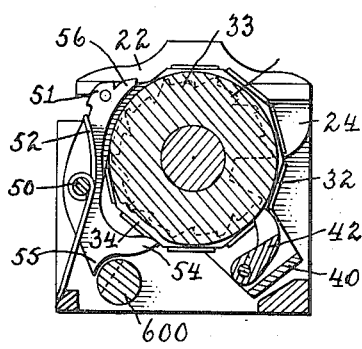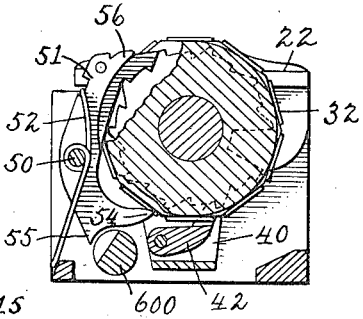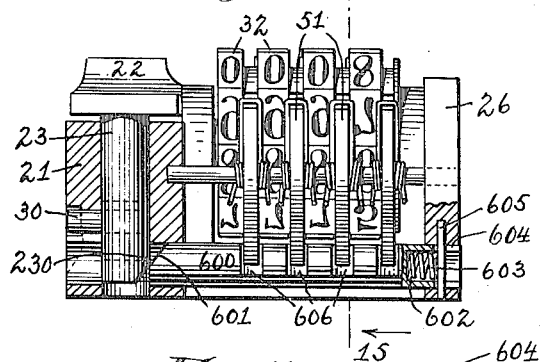

UNITED STATES PATENT OFFICE.

MAXIMILIAN H. KERN, OF RIDGEWOOD, NEW YORK, ASSIGNOR TO ROBERTS NUMBERING MACHINE COMPANY, OF BROOKLYN, NEW YORK, A CORPORATION OF NEW YORK.

NUMBERING-MACHINE.

1,157,699. Specification of Letters Patent. Patented Oct. 26, 1915.

Application filed March 13, 1915. Serial No. 14,093.

*To all whom it may concern:*

Be it known that I, MAXIMILIAN H. KERN, a citizen of the United States, residing at Ridgewood, in the county of Queens and State of New York, have invented certain new and useful Improvements in Numbering-Machines, of which the following is a specification.

This invention relates to numbering machines and more particularly to that class of machines which are intended to be secured to a printing press, whereby through the aid of the numbering machine, the surfaces printed upon are successively impressed with a number or numbers as may be desired.

Machines of this character are under the ordinary conditions of use apt to become clogged with ink, paper fibers and the like, and the numeral wheels, as a consequence, sometimes stick together or are retarded in their movements and are apt to be overrotated or otherwise moved at improper times.

The object of this invention is to provide means whereby such rotation of the wheels is prevented except when it is desirable it should take place.

In the drawings, there is illustrated a numbering machine embodying the invention.

Figure 7:
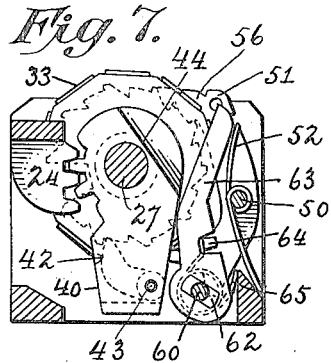
Figure 8:
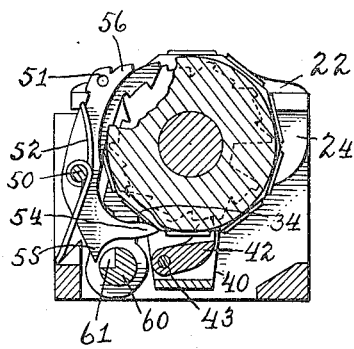
Figure 9:
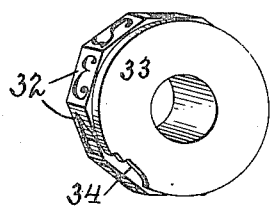
Figure 10:
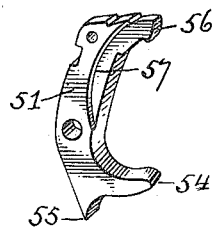
Figure 11:
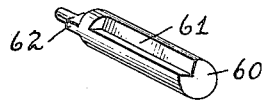

Figure 1 is a side elevation; Fig. 2 an end view, and Fig. 3 a top plan view of the machine. Figs. 4, 5, and 6 are respectively transverse sections taken on the planes of the lines 4—4, 5—5, and 6—6 in Fig. 1. Fig. 7 is a transverse section similar to Fig. 4, but showing the parts in a different position. Fig. 8 is a section similar to Fig. 6 but showing the detent out of engagement. Figs. 9, 10 and 11 are respectively perspectives of one of the numeral wheels, a detent and the auxiliary detent rocking bar. In Figs. 12, 13, 14, 15 and 16 is illustrated a modified form of the auxiliary locking device,—Fig. 12 being a side elevation and partial vertical section showing the locking bar in engagement with the detents, Fig. 13 a transverse section on the plane of the line 13—13 in Fig. 12, Fig. 14 a view similar to Fig. 12 showing the locking bar out of engagement with the detents, Fig. 15 a transverse section on the plane of the line 15—15 in Fig. 14, and Fig. 16 a perspective of the locking bar.

In the drawings, 20 is a frame adapted to support the other parts of the machine. It has a side wall 21, suitably apertured to receive a reciprocating plunger 22 having two feet 23 moving in two of the apertures referred to, and provided at one side with a downwardly projecting rack 24 the teeth of which are indicated at 25. Transversely arranged between this wall 21 and the opposite wall indicated at 26, is a numeral wheel shaft 27, secured rigidly in place by any suitable means, for instance a screw indicated at 28 (see Fig. 3). A coil spring 29 loosely placed within a third aperture in the side wall 21 serves to restore the plunger 22 to its original position after it has been pressed toward the frame by the mechanism on the printing press on which it is to be mounted. The feet 23 of the plunger 22 are suitably recessed and adapted to be engaged by the prongs of a socket staple indicated at 30. Such arrangement prevents the disengagement of the plunger from the frame but permits to it a limited reciprocation.

Loosely mounted in succession on the shaft 27 are numeral wheels, each consisting of three parts, viz., a ratchet disk 31, a digit wheel 32 provided with faces displaying letters or type, and a plain disk 33. Each ratchet disk is provided with one deep tooth and each disk 33 is provided with an indentation or recess indicated at 34.

The actuating mechanism for the numeral wheel system comprises an oscillating frame 40 adapted to swing on the shaft 27, one member of which frame is provided with teeth 41 engaged by the teeth 25 of the rack 24. At its lower edge the frame 40 is provided with a multiple pawl indicated at 42 adapted to swing on a small transverse shaft 43, the pawl being retracted to position after movement by a spring in the usual manner. The frame 40 is also provided with a recess terminating in a cam surface indicated at 44, the purpose of which will presently be explained.

In general, it may be said, that the oscillation of the pawl frame occasioned by the reciprocation of the plunger, moves the pawl against the ratchet disk of each numeral wheel and moves the latter step by step to advance the units wheel one digit for each stroke of the plunger, the deeper tooth of the ratchet disk of this wheel being provided to allow the pawl to make a stroke of greater amplitude when the tens place is reached, so that one of the other fingers on the pawl may at that time come into contact with the wheel of next higher order to actuate it one step and thus perform the operation of carrying. In a similar manner, the rotation of the second wheel to its tens place, will cause the actuation of the wheel of next higher order to move it one stroke. This mode of operation of a numbering head is common to the art.

The purpose of the invention as above stated is to prevent any undesirable rotation of the numeral wheels by holding each of them in the embrace of an oscillating detent which will only permit the numeral wheel of next higher order to be moved one stroke when the numeral wheel of adjacent lower order is in precisely the position it ought to be in to carry to the wheel of next higher order. To this end, there is provided across the frame of the machine a shaft 50 upon which are mounted a series of rocking detents indicated at 51, each detent being normally pressed by a spring indicated at 52 toward its numeral wheel. Each detent comprises a toe 54, a heel 55, a finger 56, and a cut out portion 57. Each finger 56 is in the plane of the ratchet disk 31 of the numeral wheel of next higher order, except its cut out portion 57 which is in the plane of the disk 33 of the adjacent wheel of next lower order. It will be understood that such is not the case with the detent adjacent to the units wheel which has no cut out portion. The finger 56 is pressed backward at each step-by-step movement of its numeral wheel and, engaging the teeth on its ratchet disk, locks such wheel against rotation until a new movement is imparted to it. When, however, a place is reached where the carrying operation is to take place to the wheel of next higher order, the movement of the parts and their construction is such that the toe 54 is brought opposite the indentation 34 on the disk 33 and the finger 56 is thereby disengaged and is free to move and no longer locks the wheel against rotation. Therefore at the next stroke of the wheel of lower order, the second member of the multiple pawl is permitted to move forward to actuate the wheel of next higher order. Precisely a similar operation takes place with the carrying from any one wheel to the wheel of next higher order.

Ordinarily the engagement of the finger 56 with the numeral wheel which is promoted by the spring 52 is amply sufficient to prevent any undesirable rotation of such wheel, but as a further precaution, auxiliary means is provided to prevent an accidental movement of the detents 51, and to that end there is mounted a multiple lock bar at the lower part of the frame 20. This lock bar which is designated 60 is provided with an angular longitudinal recess 61 and a squared portion 62 (see Fig. 11). A lever 63 is secured to the bar by means of an angular aperture which engages the squared portion 62, and is provided with an offset 64 by which there is secured thereto a spring 65 the other end of which bears against a portion of the frame and which spring serves constantly to move the lever downward (or toward the left as shown in Fig. 4). The upper end of the lever impinges against the frame 40, and, when the latter is oscillated, moves against the cam surface 44, passing by the cut out portion of the frame. Therefore when the frame 40 is swung on its pivot due to the depression of the plunger 22, the lever 63 is pressed upwardly and when the plunger is retracted the lever is moved in the opposite direction under the influence of the spring 65. This movement rocks the bar 60, and, as this bar is located adjacent to the lower end of the detents 51, it follows that the heels of such detents contact with and are locked by the presence of the bar 60 whenever the plunger is up, and therefore the respective numeral wheels in engagement with such detents are locked against rotation, but when the plunger 22 is down the heels 55 can swing into the angular recess 61 and the numeral wheels can turn, provided they are otherwise in condition to be turned.

In Figs. 12 to 16 inclusive there is illustrated a modified form of the auxiliary lock. In this construction one leg 23 of the plunger 22 is provided with a lower terminal beveled or cam surface 230. A bar 600 is mounted in the frame of the machine and is provided with a beveled truncated end 601 adapted to be engaged by the surface 230. It is also provided with an end recess indicated at 602 adapted to hold a spring 603 and with a slot 604 adapted to engage a guide pin 605 secured to the frame of the machine. It is also provided at intervals with cuts or recesses indicated at 606. These are so arranged that when the bar is pushed to the right by the depression of the plunger 22 and the contact of the cam surface 230 with the cam surface 601, then the planes of the heels 55 of the different detents 51 are coincident with the indentation 606, and the detents are free to move and the numeral wheels can turn, but at all other times, as these recesses 606 are not coincident in position with the detents 51 the latter are locked against movement as shown in Fig. 13.

I claim:

1. A numbering machine comprising a series of numeral wheels, a series of detents one for each wheel, an actuating pawl therefor, means one for each detent normally holding the detent against its wheel, and spring actuated means for preventing a disengagement of any detent from its wheel except when a carrying operation is being performed.

2. A numbering machine comprising a series of numeral wheels, a series of detents one for each wheel, an actuating pawl therefor, individual means for holding each detent against its particular wheel, means for preventing a disengagement of any detent from its wheel, and reciprocating means for interrupting the function of the preventing means when a carrying operation is to be performed.

3. In a numbering machine, comprising a series of numeral wheels, an actuating pawl therefor, a series of detents one for each wheel and means for preventing a disengagement of any detent from its wheel except when a carrying operation is being performed, additional means common to all of the detents separately for preventing such disengagement adapted also to be disabled when a carrying operation is to be performed.

4. In a numbering machine comprising a series of numeral wheels, a series of detents one for each wheel and means one for each wheel for normally preventing a disengagement of any detent from its wheel, in combination with means common to all of the wheels for normally preventing a disengagement of any detent from its wheel, and automatic means for interrupting the function of both preventing means when a carrying operation is to be performed.

5. In a numbering machine comprising a series of numeral wheels, a series of detents one for each wheel, means for each wheel for normally preventing a disengagement of any detent from its wheel, including a disk on each wheel adapted to be engaged by its detent except at one position of the disk, in combination with means common to all of the wheels for normally preventing a disengagement of any detent from its wheel.

6. In a numbering machine comprising a series of numeral wheels, a detent for each wheel, means for normally preventing a disengagement of any detent from its wheel, comprising a disk on each wheel having an indentation and a lock bar common to all the wheels having indentations each detent being adapted to engage the indentation of its particular wheel disk and all of the detents being adapted to engage the indentation of the lock bar.

7. A numbering machine comprising a series of numeral wheels, a series of detents one for each wheel, means for holding each detent normally against its wheel, and means for preventing a disengagement of any detent and its wheel except when a carrying operation is being performed, including a disk on each wheel adapted to be engaged by its detent except at one position of the disk.

8. In a machine of the class described including a series of numeral wheels, and means for rotating them in succession, two automatic means for holding the wheels against accidental rotation, one acting on each wheel and the other on all the wheels of the series.

9. In a machine of the class described, including a series of numeral wheels and means for rotating them in succession, two automatic means for holding the wheels against accidental rotation, one means acting on each wheel and the other acting on all the wheels of the series, in combination with means for automatically interrupting the function of the holding means whenever a carrying operation is to be performed.

10. In a machine of the character described, a numeral wheel detent comprising a body terminating in a finger at one end and a heel and toe at the other and provided with an intermediate curved recess extending only partially along and across the body of the detent.

11. In a machine of the character described, the combination with a numeral wheel having a ratchet disk and a cylindrical disk secured thereto having a single indentation, of a detent including a member adapted to engage the ratchet disk, a second member adapted to engage the cylindrical disk and a third member adapted to engage the indentation of such disk.

12. In a machine of the character described, the combination with a numeral wheel having a ratchet disk and a cylindrical disk secured thereto having a single indentation, and a lock bar having a recess, of a detent having one member adapted to engage the ratchet disk, a second member adapted to engage the cylindrical disk, a third member adapted to engage the indentation of the cylindrical disk, and a fourth member adapted to engage the recess of the lock bar.

13. In a machine of the class described including a series of numeral wheels and means for rotating them in succession, two automatic means for holding the wheels against accidental rotation, one means acting on each wheel and the other acting on all the wheels of the series, the means acting on each wheel including a detent for each wheel and the means acting on the series of wheels including a lock bar coöperating with all of the detents.

14. In a machine of the class described including a series of numeral wheels and means for rotating them in succession, two automatic means for holding the wheels against accidental rotation, one means acting on each wheel and the other acting on all the wheels of the series, the means acting on each wheel including a detent for each wheel and the means acting on the series of wheels including a lock bar coöperating with all of the detents, in combination with means for automatically interrupting the function of the holding means whenever a carrying operation is to be performed.

15. In a machine of the class described including a series of numeral wheels and means for rotating them in succession, two automatic means for holding the wheels against accidental rotation, one means acting on each wheel and the other acting on all the wheels of the series, the means acting on each wheel including a detent for each wheel and the means acting on all the series of wheels including a lock bar coöperating with all of the detents, in combination with means for automatically interrupting the function of the holding means whenever a carrying operation is to be performed, consisting of an interruption in the continuity of the surfaces of the numeral wheel and lock bar.

16. In a machine of the character described, a series of numeral wheels, a pawl and its frame, said frame having a pivotal movement, detents one for each wheel adapted to engage the wheels to prevent their accidental movement, and means common to all of the detents for holding all of the detents locked against accidental movement.

17. In a machine of the character described, a series of numeral wheels, a pawl and its frame, detents one for each wheel adapted to engage the wheels to prevent their accidental movement, and means for holding all of the detents locked against accidental movement including a spring pressed lock bar rocked from the pawl frame.

18. In a machine of the character described, a series of numeral wheels, a pawl and its frame, detents one for each wheel adapted to engage the wheels to prevent their accidental movement, and means engaging each detent for holding each of the detents locked against accidental movement including a lock bar rocked from the pawl frame and which bar is provided with a recess to allow the movement of the detent when the lock bar is in one position.

19. In a machine of the character described, the combination with numeral wheel and means for rotating them of detents for preventing their accidental displacement and spring actuated means for preventing the accidental displacement of said detents.

20. In a machine of the character described, the combination with numeral wheels and means for rotating them, of individual means for preventing their accidental displacement and a common means engaging each individual means for preventing the accidental displacement of such individual preventing means.

21. A numbering machine comprising numeral wheels, an actuating mechanism and carrying devices, in combination with detents for preventing the accidental rotation of each wheel, automatic means common to all of the detents for preventing the accidental displacement of the said detents and automatic means adapted to interrupt the function of the rotation-preventing means during a carrying operation.

22. A numbering machine comprising numeral wheels, an actuating mechanism and carrying devices, in combination with a series of detents one for each wheel, adapted to hold the wheel against accidental actuation, and a single means common to all of the detents for preventing the accidental displacement of the detents.

23. A numbering machine comprising numeral wheels, an actuating mechanism and carrying devices, in combination with a series of detents one for each wheel, adapted to hold the wheel against accidental actuation, and a single means common to all of the detents for preventing the accidental displacement of the detents and means for releasing each of the detents to permit the actuation of the numeral wheels while carrying.

24. A numbering machine comprising numeral wheels, an actuating mechanism and carrying devices, in combination with a series of detents one for each wheel, adapted to hold the wheel against accidental actuation, and a single shiftable means for preventing the accidental displacement of the detents and means for releasing the detents and their common displacement-preventing-means to permit of the actuation of the wheels during a carrying operation.

25. A numbering machine comprising numeral wheels, an actuating mechanism including a reciprocating plunger and carrying devices, in combination with automatic means for preventing the accidental rotation of each wheel separately, automatic means for preventing the accidental displacement of such preventing means and means adapted to interrupt the function of the means last mentioned during a carrying operation brought into operation through the movement of the plunger.

26. In a machine of the character described, numeral wheels, individual detents separately movable therefor, a lock bar common to all the detents to prevent their accidental movement, an actuating plunger, transmitting devices to rock the lock bar by the movement of the plunger and a recess in the lock bar to permit the movement of the detents at a predetermined point in the movement of the plunger.

27. In a machine of the character described, numeral wheels, individual detents therefor, a lock bar common to all the detents to prevent their accidental movement, an actuating plunger, a pawl frame swung thereby, a spring pressed lever moved in one direction by the pawl frame and the other by a spring, a connection between the lock bar and the lever, and an interruption in the continuity of the surface of the lock bar to permit the detents to move away from the wheels at one point in the movement of the plunger.

In testimony whereof I affix my signature in presence of two witnesses.

MAXIMILIAN H. KERN.

Witnesses:
ALDA L. MILLER,
MARY H. LEWIS.